(12) United States Patent
Ahmed et al.

(10) Patent No.: US 12,312,456 B1
(45) Date of Patent: *May 27, 2025

(54) ACRYLATE/CHALCONE POLYSTYRENE COMPOSITE AND USES THEREOF

(71) Applicant: IMAM MOHAMMAD IBN SAUD ISLAMIC UNIVERSITY, Riyadh (SA)

(72) Inventors: Khalid Hassan Ibnouf Ahmed, Riyadh (SA); Hajo Idriss Mohammed Idriss, Riyadh (SA); Osamah Abdulrahman Aldaghri, Riyadh (SA); Amin Osman Elzupir Alamalhuda, Riyadh (SA)

(73) Assignee: IMAM MOHAMMAD IBN SAUD ISLAMIC UNIVERSITY, Riyadh (SA)

(*) Notice: Subject to any disclaimer, the term of this patent is extended or adjusted under 35 U.S.C. 154(b) by 0 days.

This patent is subject to a terminal disclaimer.

(21) Appl. No.: 18/968,533

(22) Filed: Dec. 4, 2024

Related U.S. Application Data

(63) Continuation of application No. 18/765,927, filed on Jul. 8, 2024, now Pat. No. 12,187,875.

(51) Int. Cl.
  *C08K 5/18* (2006.01)
  *H01S 3/16* (2006.01)
  *H01S 3/20* (2006.01)

(52) U.S. Cl.
  CPC ............ *C08K 5/18* (2013.01); *H01S 3/16* (2013.01); *H01S 3/20* (2013.01)

(58) Field of Classification Search
  CPC .............. C08K 5/18; H01S 3/16; H01S 3/20
  See application file for complete search history.

(56) References Cited

U.S. PATENT DOCUMENTS

| | | | |
|---|---|---|---|
| 5,087,540 A | 2/1992 | Murakami et al. | |
| 12,187,875 B1 * | 1/2025 | Ahmed | ............ C08K 5/18 |

FOREIGN PATENT DOCUMENTS

| | | |
|---|---|---|
| CN | 100483112 C | 4/2009 |
| CN | 115466187 A | 12/2022 |

OTHER PUBLICATIONS

Zhou et al. ; Preparation of Fluorescent Polystyrene via ATRP with Dimethylamino Chalcones as Initiator ; Chinese Journal of Chemistry, vol. 32, Issue 7 ; Jun. 5, 2014 ; 1 Page ; Abstract Only.

Aldaghri et al. ; Spectral Characteristics and Molecular Structure of (E)-1-(4-Chlorophenyl)-3-(4-(Dimethylamino)Phenyl)Prop-2-en-1-One (DAP) ; MDPI materials, 14 ; May 23, 2021 ; 11 Pages.

Barim et al. ; Spectral Characteristics and Molecular Structure of (E)-1-(4-Chlorophenyl)-3-(4-(Dimethylamino)Phenyl)Prop-2-en-1-One (DAP) ; Polymer(Korea), vol. 39, No. 1 ; Jul. 1, 2014 ; 10 Pages.

* cited by examiner

*Primary Examiner* — Angela C Scott
(74) *Attorney, Agent, or Firm* — Oblon, McClelland, Maier & Neustadt, L.L.P.

(57) ABSTRACT

A polystyrene-based chalcone including units of a 1-(2H-1,3-benzodioxol-5-yl)-3-[4-(dimethylamino)phenyl]-(2E)-propane-1-one and units of a 2-hydroxyethyl methacrylate. The units of the 1-(2H-1,3-benzodioxol-5-yl)-3-[4-(dimethylamino)phenyl]-(2E)-propane-1-one and the units of the 2-hydroxyethyl methacrylate are in a matrix of a polystyrene. A process for preparing the polystyrene-based chalcone and application as a laser medium with fine coating characteristics.

19 Claims, 5 Drawing Sheets

ACRYLATE/CHALCONE POLYSTYRENE COMPOSITE AND USES THEREOF

CROSS-REFERENCE TO RELATED APPLICATIONS

The present application is a Continuation of U.S. application Ser. No. 18/765,927, now allowed, having a filing date of Jul. 8, 2024.

BACKGROUND

Technical Field

The present disclosure is directed to a polystyrene-based chalcone, its synthesis and use as an efficient thermal laser medium, and its smart coating characteristics.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Scientific and technological progress, along with an increasing global population, have increased needs for plastics and plastic materials. Plastic materials have been extensively applied in several human life and industry domains, including packaging, construction, furniture, household items, electrical and electronic devices, transportation, agriculture, and the like. The annual global production of plastics amounts to approximately 322 million tons. Plastics account for 20% to 30% of municipal solid waste in landfill sites, including those in the United States, Germany, and Australia. Polystyrene (PS), like other plastics, is commonly utilized because of its favorable mechanical characteristics and affordable price. PS is an artificial aromatic polymer with a large molecular weight. Its chemical formula, $(C_8H_8)_n$, is produced by combing individual styrene monomer units. PS can exist in a solid or foamed state, whereas monomer styrene is a liquid. General purpose polystyrene is transparent, rigid, and somewhat fragile. It is a cost-effective polymer in terms of weight per unit. PS has limited effectiveness in preventing the passage of oxygen and water vapor and has a relatively low temperature at which it melts. Polystyrene, a highly utilized plastic in various fields, is catching global attention due to its advantages, affordability, lightweight nature, easy production, adaptability, thermal effectiveness, long-lastingness, and resistance to dampness; however, PS foam waste has steadily risen in recent years. PS foam waste has increased due to its use in various applications, such as insulation, packaging, storage, building industry, paper cups, plates, cutlery, compact disks, serving food products, and the like. Persistent accumulation of plastic waste is a local issue as well as a global issue, with the global production of PS amounting to around 21 million tons in 2013. Due to the extensive use of plastics, especially PS, they have become widespread in the environment, leading to environmental contamination, human health issues, and ecosystem changes. PS is highly stable and exhibits resistance to natural degradation after disposal. The recycling of this has recently garnered global interest as a result of shifts in both regulatory and environmental concerns. Rising landfill expenses and diminishing landfill capacity are compelling the exploration of alternative solutions for eliminating polystyrene debris. Although it is possible to recycle PS materials, most PS foam is in landfills. Due to its lightweight and voluminous nature, transportation expenses constitute a large portion of the recycling process for PS foam. Various measures have been implemented to mitigate the negative environmental impact produced by PS, including minimizing the utilization of PS goods and employing modified PS materials that can decompose naturally in the environment.

Photonics is an emerging field that includes the generation, emission, transmission, modulation, signal processing, switching, amplification, detection, and sensing of light. It is being explored as a basis for new technology that explores the capability of a photon to carry information and energy. Chalcones are a class of compounds containing an unsaturated system with a carbonyl group that can be tuned for optical properties. Chalcones have been synthesized and their photophysical properties have been investigated as new laser mediums under the influence of solvents, concentrations, and pump power excitation.

CN115466187A discloses 1'-hydroxy-2'-anthracene chalcone and its derivatives for performance as a laser medium. CN100483112C, discloses 4-amido-4'-N, N-dimethylamino chalcone as a fluorescent sensor for detecting water content in an organic solvent.

There is a global need to recycle PS. A PS-based chalcone may be explored for use as an efficient thermal laser medium and smart coating. Accordingly, an object of the present disclosure is to provide a polystyrene foam waste-based chalcone for a thermal laser medium and a smart coating that overcomes shortcomings of the art.

SUMMARY

In an exemplary embodiment, a polystyrene-based chalcone is described. The polystyrene-based chalcone includes a 1-(2H-1,3-benzodioxol-5-yl)-3-[4-(dimethylamino)phenyl]-(2E)-propane-1-one; and units of a 2-hydroxyethyl methacrylate, wherein the units of the 1-(2H-1,3-benzodioxol-5-yl)-3-[4-(dimethylamino)phenyl]-(2E)-propane-1-one and the units of the 2-hydroxyethyl methacrylate are in a matrix of a polystyrene.

In some embodiments, the polystyrene-based chalcone is made by a process comprising mixing 1-(2H-1,3-benzodioxol-5-yl)-3-[4-(dimethylamino)phenyl]-(2E)-propane-1-one and 2-hydroxyethyl methacrylate to form a first solution; dissolving polystyrene in a polar organic solvent while heating to form a second solution; mixing the first solution and the second solution at a temperature of 80 to 100° C. to form a reaction mixture; and cooling the reaction mixture to room temperature for 30 to 90 minutes.

In some embodiments, the molar ratio of the 1-(2H-1,3-benzodioxol-5-yl)-3-[4-(dimethylamino)phenyl]-(2E)-propane-1-one to the 2-hydroxyethyl methacrylate is from 1:500 to 1:600. In some embodiments, the weight ratio of the 1-(2H-1,3-benzodioxol-5-yl)-3-[4-(dimethylamino)phenyl]-(2E)-propane-1-one to the polystyrene is from 1:10 to 1:25.

In some embodiments, the polar organic solvent is tetrahydrofuran.

In some embodiments, the cooled reaction mixture is a liquid.

In some embodiments, the liquid has a laser spectrum signal at 555 to 565 nm and 580 to 590 nm, wherein the laser spectrum signal at 555 to 565 nm is 8 to 12 times more intense than the laser spectrum signal at 580 to 590 nm.

In some embodiments, the process further includes heating and agitating the reaction mixture to 130 to 170° C. for 10 to 30 minutes to form a product and cooling the product to room temperature for 8 to 12 days, wherein the product is solid. The solid has a solid laser medium at 545 to 555 nm and 580 to 590 nm, wherein the laser spectrum signal at 580 to 590 nm is 1 to 2 times more intense than the laser spectrum signal at 545 to 555 nm.

In some embodiments, the polystyrene-based chalcone has a melting point of 330 to 370° C. The polystyrene-based chalcone has a fluorescence signal at 530 to 540 nm. The polystyrene-based chalcone has a laser intensity of 0.5 to 3 atomic units (a.u.) at a temperature of 25 to 35° C. The polystyrene-based chalcone has a laser intensity of 8 to 10 a.u. at a temperature of 80 to 100° C. The polystyrene-based chalcone has a laser intensity of 14 to 17 a.u. at a temperature of 110 to 130° C. The polystyrene-based chalcone has a laser intensity of 20 to 25 a.u. at a temperature of 190 to 210° C.

In some embodiments, the polystyrene is bonded to the units of the 1-(2H-1,3-benzodioxol-5-yl)-3-[4-(dimethylamino)phenyl]-(2E)-propane-1-one and the units of the 2-hydroxyethyl methacrylate wherein the units of the 2-hydroxyethyl methacrylate are linkers in between the units of the 1-(2H-1,3-benzodioxol-5-yl)-3-[4-(dimethylamino)phenyl]-(2E)-propane-1-one.

In some embodiments, the units of the 2-hydroxyethyl methacrylate are linkers in between the units of the 1-(2H-1,3-benzodioxol-5-yl)-3-[4-(dimethylamino)phenyl]-(2E)-propane-1-one.

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1A:
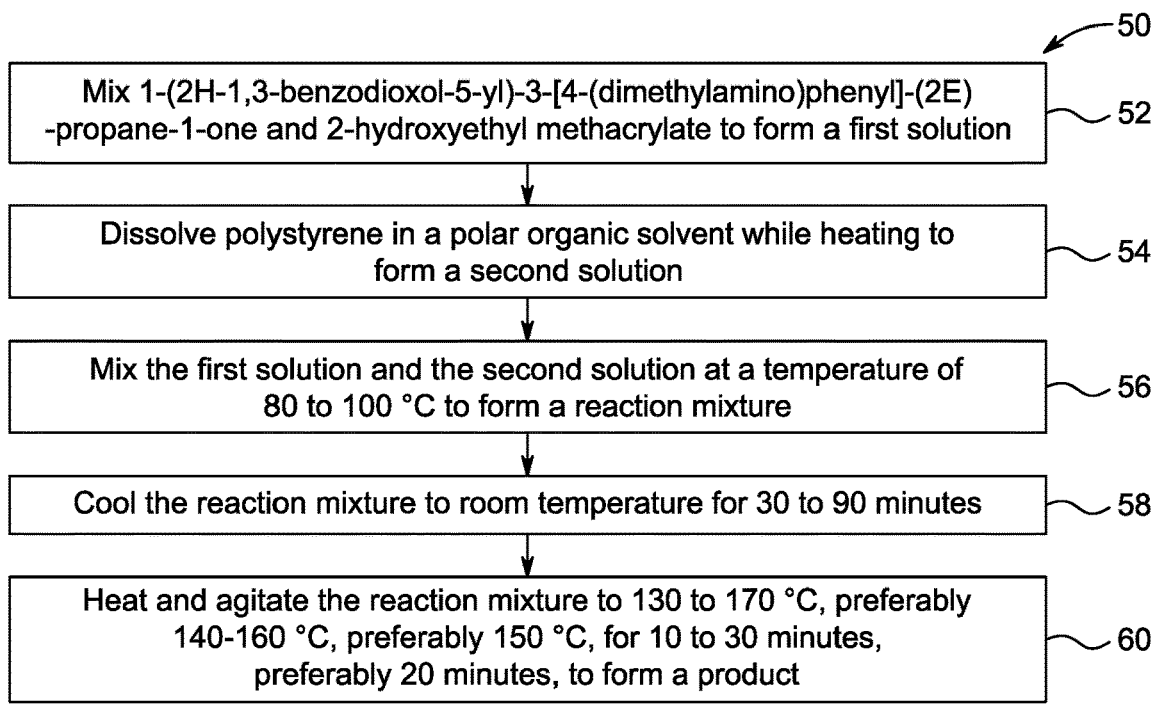
FIG. 1A is a flowchart depicting a detailed process of preparing a polystyrene-based chalcone (PBC), according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally mean "one or more" unless stated otherwise.

Furthermore, the terms "approximately," "approximate," "about," and similar terms generally refer to ranges that include the identified value within a margin of 20%, 10%, or preferably 5%, and any values there between. Within the description of this disclosure, where a numerical limit or range is stated, the endpoints are included unless stated otherwise. Also, all values and subranges within a numerical limit or range are specifically included as if explicitly written out.

As used herein, the term "polymer" refers to a class of natural or synthetic substances composed of large molecules (macromolecules) that contain of multiples of simpler chemical units (or subunits) sometimes referred to as monomers chemically bonded to one another. A polymer is a larger molecule made of multiple smaller units of smaller molecules (monomers), repeating themselves in an ordered or random arrangement.

As used herein, "molar ratio" refers to a ratio of the amounts in moles of the compounds present in a mixture or compounds participating in a chemical reaction.

As used herein, the term "solution" refers to a mixture of two or more components wherein the mixture is homogeneous.

As used herein, the term "solvent" refers to a substance in which a solute is dissolved to form a solution.

Unless otherwise noted, the present disclosure is intended to include all isotopes of the samples used herein.

Aspects of the present disclosure are directed to a polystyrene-based chalcone (PBC) material for use as an efficient thermal laser medium and smart coating. The polystyrene-based chalcone material was synthesized by combining polystyrene foam waste (PS), 2-hydroxyethyl methacrylate (2-HEMA), and a chalcone of 1-(2H-1,3-benzodioxol-5-yl)-3-[4-(dimethylamino)phenyl]-(2E)-propane-1-one with heat assist. The polystyrene-based chalcone material of the present disclosure displayed strong laser and fine coating characteristics and maintained its stability under photochemical conditions. The PBC material can be utilized in a smart coating procedure due to its ability to withstand dissolution or corrosion when exposed to water and/or organic solvents.

A polystyrene-based chalcone (PBC), also referred to as a polystyrene-based chalcone material and/or a PBC material, is described. The PBC includes 3 components—a chalcone, a linker, and a polymer matrix. In a preferred embodiment, the chalcone is 1-(2H-1,3-benzodioxol-5-yl)-3-[4-(dimethylamino)phenyl]-(2E)-propane-1-one (BDPP). In some embodiments, other chalcones, such as 3-(4-(N,N-dimethylamino)phenyl)-1-phenylprop-2-en-1-one, 3-(4-(N,N-dimethylamino)phenyl)-1-(4-nitrophenyl)prop-2-en-1-one, 1-(5-methylthiophene-2-yl)-3-(4-(N,N-diphenylamino)phenyl)-prop-2-en-1-one, 1-(5-bromothiophene-2-yl)-3-(4-(N,N-diphenylamino)phenyl)prop-2-en-1-one, 1-(2,20-dithiophene-5-yl)-3-(4-(N,N-di phenylamino)phenyl)prop-2-en-1-one, 1-(5-((9H-fluoren-9-ylidene)methyl)thiophene-2-yl)-3-(4-(N,N-diphenylamino)phenyl)prop-2-en-1-one), 1-(4-bromophenyl)-3-(4-(N,N-diphenylamino) phenyl)prop-2-en-1-one, (E)-1-(4-chlorophenyl)-3-(4-(dimethylamino) phenyl)prop-2-en-1-one, and the like, may be used alone or in combination with BDPP.

In a preferred embodiment, the PBC includes one or more units of BDPP which are connected to each other via one or more units of a linker. In a preferred embodiment, the linker is 2-hydroxyethyl methacrylate (2-HEMA). In some embodiments, other linkers may be used as well, for example, divinylbenzene, allylmethacrylate, ethyleneglycol dimethacrylate, neopentylglycol tetraethyleneglycol dimethacrylate, dimethacrylate, poly(ethyleneglycol)dimethacrylate, vinyl carbonate derivatives of the diols and polyols, methacryloxyethyl vinyl carbonate, and the like, in combination or in place of 2-HEMA.

In a specific embodiment, the PBC includes one or more units of BDPP and one or more units of a 2-hydroxyethyl methacrylate (2-HEMA). The one or more units of BDPP and the one or more units of 2-HEMA may be reacted units. In some embodiments, the units of the 2-hydroxyethyl methacrylate act as linkers between the units of the BDPP. In some embodiments, the units of BDPP and the units of 2-hydroxyethyl methacrylate may be linked in an alternating pattern. In some embodiments, a first unit of BDPP may be bonded to a first unit of 2-HEMA, which may be bonded to a second unit of BDPP, which may be bonded to a second unit of 2-HEMA, and so on in an alternating pattern. In some other embodiments, 2 to 20, preferably 2 to 15, preferably 4 to 10 or preferably 5 to 8, units of BDPP may be linked in a row followed by 1 to 50, preferably 2 to 25, preferably 2 to 20, preferably 4 to 15, preferably 5 to 10 or preferably 6 to 8, units of 2-hydroxyethyl methacrylate linked in a row followed by one or more units of BDPP followed by one or more units of 2-HEMA, and so on. In some embodiments, a first unit of BDPP may be separated from a second unit of BDPP by 1 to 100 units, preferably 2 to 80 units, preferably 3 to 70 units, preferably 4 to 60 units, preferably 5 to 50 units, preferably 10 to 25 units or preferably 15 to 20 units of 2-HEMA. In other embodiments, the units of BDPP and the units of 2-HEMA may be linked in any alternating and repetitive order. The units of BDPP and the units of 2-hydroxyethyl methacrylate are dispersed in the polymer matrix, including polystyrene. In some embodiments, the polymer matrix may not be limited to polystyrene alone but may be used alone or in combination with other polymers, such as polymethylmethacrylate, polyvinylchloride, and the like, in various ratios as may be obvious to a person skilled in the art. In some embodiments, the polystyrene may be bonded to the units of the 1-(2H-1,3-benzodioxol-5-yl)-3-[4-(dimethylamino)phenyl]-(2E)-propane-1-one and the units of the 2-hydroxyethyl methacrylate. In some embodiments, the polystyrene may interact with the units of BDPP and the units of 2-HEMA via intermolecular forces and physical forces, such as a layered. In other embodiments, the polystyrene may be bonded to the units of BDPP and the units of 2-HEMA via intramolecular forces.

FIG. 1A illustrates a flowchart of a method 50 of making a polystyrene-based chalcone (PBC). The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing 1-(2H-1,3-benzodioxol-5-yl)-3-[4-(dimethylamino)phenyl]-(2E)-propane-1-one (BDPP) and 2-hydroxyethyl methacrylate to form a first solution. In some embodiments, wherein a molar ratio of the BDPP to the 2-hydroxyethyl methacrylate is from 1:500 to 1:600, preferably 1:510 to 1:590, preferably 1:520 to 1:580, preferably 1:530 to 1:570, preferably 1:540 to 1:560, or preferably about 1:550. In an embodiment, the first solution was heated at a temperature of 25 to 100° C., preferably 30 to 90° C., preferably 40 to 80° C., preferably 50 to 70° C., or preferably about 60° C. and stirred for 1 to 5 minutes, preferably 2 to 4 minutes, and more preferably about 3 minutes.

At step 54, the method 54 includes dissolving polystyrene in a polar organic solvent while heating to form a second solution. Suitable examples of the polar organic solvent include, tetrahydrofuran, acetonitrile, acetone, dimethylformamide (DMF), dimethylsulfoxide (DMSO), isopropanol, methanol, and the like. In a preferred embodiment, the polar organic solvent is tetrahydrofuran.

At step 56, the method 50 includes mixing the first solution and the second solution at a temperature of 80 to 100° C., preferably 85 to 95° C., and more preferably about 90° C. for 5-15 minutes, preferably 8 to 12 minutes, and more preferably about 10 minutes, to form a reaction mixture. In some embodiments, the weight ratio of the BDPP to the polystyrene is from 1:10 to 1:25, preferably 1:12 to 1:23, preferably 1:15 to 1:20, or preferably 1:16 to 1:18.

At step 58, the method 50 includes cooling the reaction mixture to room temperature for 30 to 90 minutes, preferably 40 to 80 minutes, more preferably 50 to 70 minutes, and yet more preferably about 60 minutes to form the PBC. The PBC thus formed is a liquid. In some embodiments, the liquid PBC has a laser spectrum signal at 555 to 565 nm, preferably 556 to 564 nm, preferably 557 to 563 nm, preferably 558 to 562 nm, more preferably 559 to 561 nm, and more preferably about 560 nm and at 580 to 590 nm, preferably 581 to 589 nm, preferably 582 to 588 nm, preferably 583 to 587 nm, more preferably 584 to 586 nm, and yet more preferably about 585 nm. The laser spectrum signal at 555 to 565 nm is 8 to 12 times, preferably 9 to 11 times, and more preferably about 10 times more intense than the laser spectrum signal at 580 to 590 nm.

At step 60, the method 50 includes heating and agitating the reaction mixture to 130 to 170° C., preferably 135 to 165° C., preferably 140 to 160° C., more preferably 145 to 155° C., and yet more preferably about 150° C., for 10 to 30 minutes, preferably 12 to 28 minutes, preferably 15 to 25 minutes, more preferably 18 to 22 minutes, and more preferably about 20 minutes, to form a product. The product includes PBC. The product is further cooled to room temperature for 8 to 12 days, preferably 9 to 11 days, and more preferably about 10 days to form the PBC in the form of a solid. In some embodiments, the solid PBC has a laser medium at 545 to 555 nm, preferably 546 to 554 nm, preferably 547 to 553 nm, preferably 548 to 552 nm, more preferably 549 to 551 nm, and yet more preferably about 550 nm and at 580 to 590 nm, preferably 581 to 589 nm, preferably 582 to 588 nm, preferably 583 to 587 nm, more preferably 584 to 586 nm, and yet more preferably about 585 nm. In some embodiments, the laser spectrum signal at 580 to 590 nm is 1 to 2 times, preferably 1.2 to 1.8 times, more preferably 1.5 to 1.7 times, and yet more preferably about 1.6 times more intense than the laser spectrum signal at 545 to 555 nm.

The PBC of the present disclosure has a melting point of 330 to 370° C. In some embodiments, the PBC of the present disclosure has a fluorescence signal at 530 to 540 nm. In some embodiments, at a temperature of 25 to 35° C., preferably about 30° C., the PBC has a laser intensity of 0.5 to 3 atomic units (a.u.), preferably 1 to 2 a.u. In some embodiments, at a temperature of 80 to 100° C., preferably about 90° C., the PBC has a laser intensity of 8 to 10 a.u., preferably about 9 a.u. In some embodiments, at a temperature of 110 to 130° C., preferably about 120° C., the PBC has a laser intensity of 14 to 17 a.u., preferably 15 to 16 a.u. In some embodiments, at a temperature of 190 to 210° C., preferably about 200° C., the PBC has a laser intensity of 20 to 25 a.u., preferably 21 to 24 a.u., and more preferably about 22 to 23 a.u.

EXAMPLES

The disclosure will now be illustrated with working examples, which are intended to illustrate the working of the disclosure and not intended to restrictively imply any limitations on the scope of the present disclosure, as many variations thereof are possible without departing from the spirit and scope of the present disclosure. The working examples depict an example of the polyimide of the present disclosure. The following examples demonstrate the synthesis of a polyimide and membrane fabricated with the polyimide, as disclosed herein. The following examples demonstrate a polystyrene-based chalcone (PBC) photonics material that displays strong laser and fine coating characteristics and a process of preparing them, as described herein. The examples are provided solely for illustration and are not to be construed as limitations of the present disclosure.

Example 1: Materials 1-(2H-1,3-benzodioxol-5-yl)-3-[4-(dimethylamino)phenyl]-(2E)-propane-1-one (BDPP) and 2-hydroxyethyl methacrylate (2-HEMA) were purchased from Sigma-Aldrich and used in studies without any further purification. The chemical structure of BDPP is shown in FIG. 1C.

Example 2: Synthesis of Polystyrene-Based Chalcone (PBC)

Figure 1B:
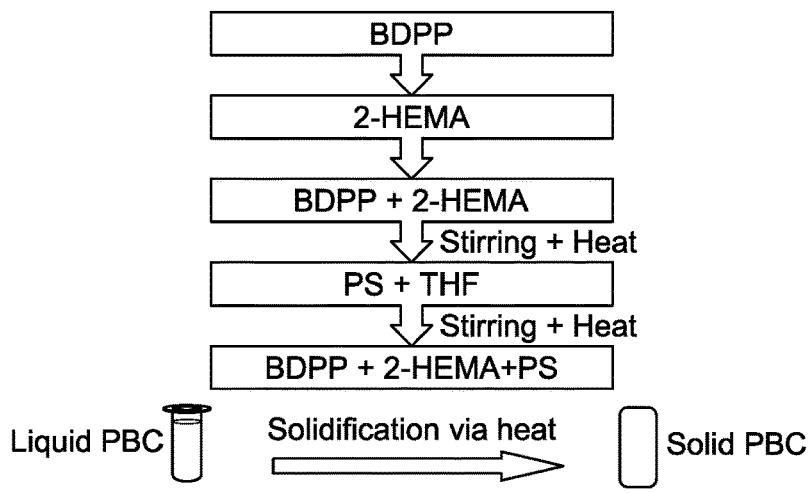
FIG. 1B is a schematic illustration depicting synthesis of PBC, according to certain embodiments.
Figure 1C:
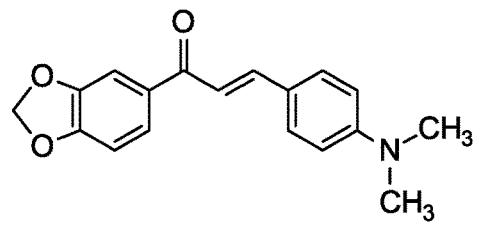
FIG. 1C shows the chemical structure of 1-(2H-1,3-benzodioxol-5-yl)-3-[4-(dimethylamino)phenyl]-(2E)-propane-1-one (BDPP), according to certain embodiments.

A schematic illustration depicting the synthesis of PBC is depicted in FIG. 1B. A mixture of 0.023 grams of BDPP and 5 mL of 2-HEMA was heated and stirred for 3 minutes to produce a homogeneous, transparent, bright orange solution of BDPP+2-HEMA. 0.43 grams of polystyrene (PS) was completely dissolved in 10 mL of tetrahydrofuran (THF) and heated with constant stirring. Subsequently, PS dissolved in THF was introduced into the solution containing BDPP and 2-HEMA while stirring and heating at 90° C. The mixture was continuously stirred and heated for 10 minutes, resulting in a homogeneous liquid with a light amber color, consisting of liquid PBC (BDPP+2-HEMA+PS). The resulting mixture was allowed to cool at ambient temperature for one hour. It was then heated to 150° C. and agitated for an additional 20 minutes. Finally, it was chilled at room temperature for a period of 10 days to obtain a yellow solid material of PBC.

Example 3: Optical Properties of PBC

Figure 2:
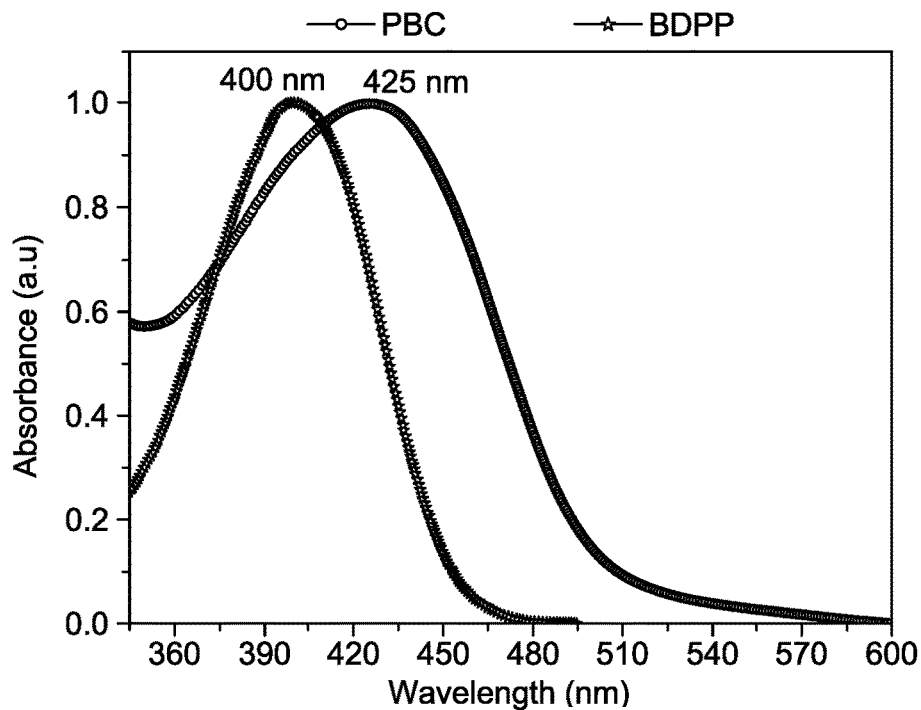
FIG. 2 shows absorption spectra of PBC and BDPP, according to certain embodiments.
Figure 3:
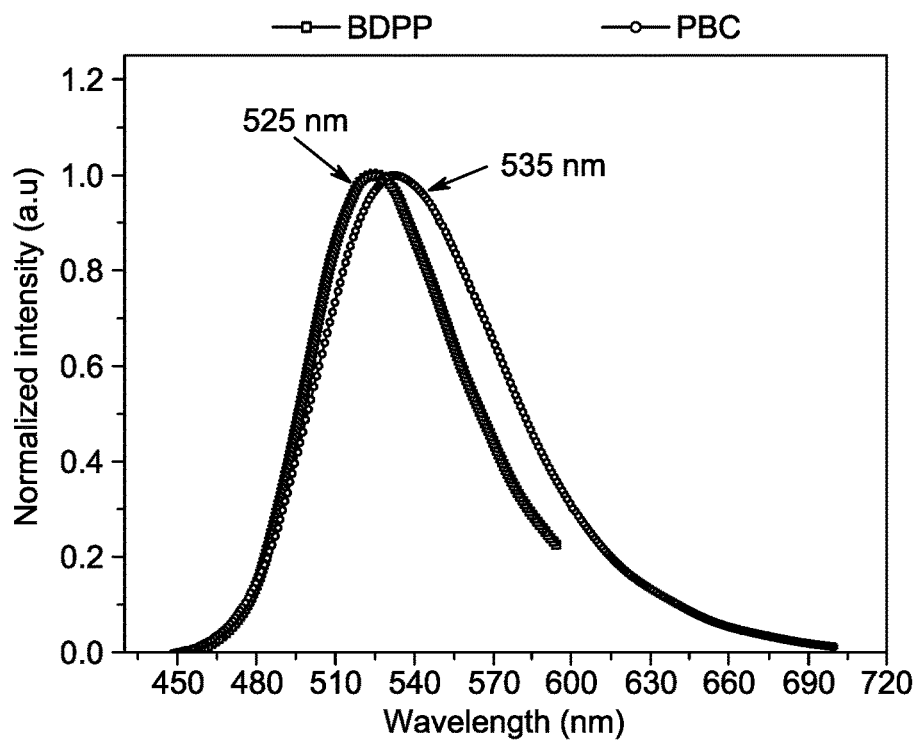
FIG. 3 shows fluorescence spectra of PBC (solid) and BDPP, according to certain embodiments.

Dimethylamino-based chalcones show broad band spectra in the UV-Vis range, which makes the chalcone of the present disclosure a potential candidate for tuning laser medium. The N,N-dimethylamino group in the para position in a ring B of the chalcones has shown enhanced photophysical properties via intramolecular transfer [Aldaghri, Spectral Characteristics and Molecular Structure of (E)-1-(4-Chlorophenyl)-3-(4-(Dimethylamino)Phenyl)Prop-2-en-1-One (DAP), Materials 14 (2021) 2766, which is incorporated herein by reference in its entirety]. The optical properties, absorption, and fluorescence were recorded using a crystal quartz cuvette. The absorption spectra were measured for a wide range from 100-1000 nm using a Perkin-Elmer Lambda 950 UV-vis-NIR Spectrophotometer (Waltham, MA, USA), which has a double monochromator with holographic grating and double beam with ratio recording organized by a computer. In the emission spectra, a Perkin-Elmer LS55 spectrofluorometer (Waltham, MA, USA) range was used in the range of 200 to 900 nm at room temperature. The excitation wavelength was fixed at 355 nm. The absorption spectrum of BDPP shows an absorption band at 400 nm, as seen in FIG. 2. The final product, PBC, as solid and liquid samples shows a band at 425 nm, as depicted in FIG. 2. The fluorescence spectrum of BDPP shows a band at 525 nm, whereas the PBC exhibits a band at 535 nm, as seen in FIG. 3.

Figure 4:
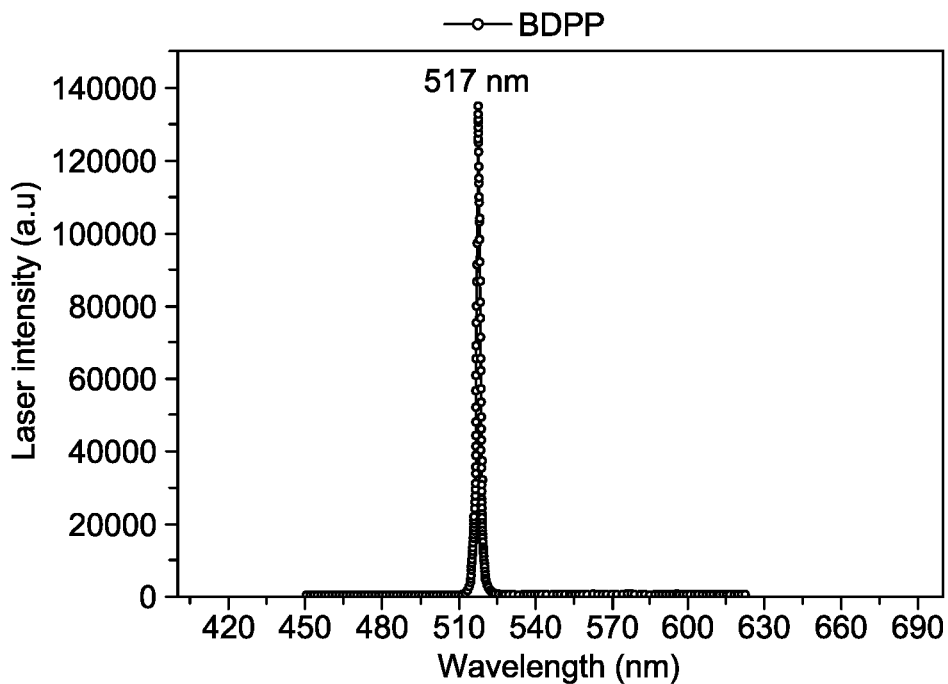
FIG. 4 shows a laser spectrum of BDPP, according to certain embodiments.
Figure 5:
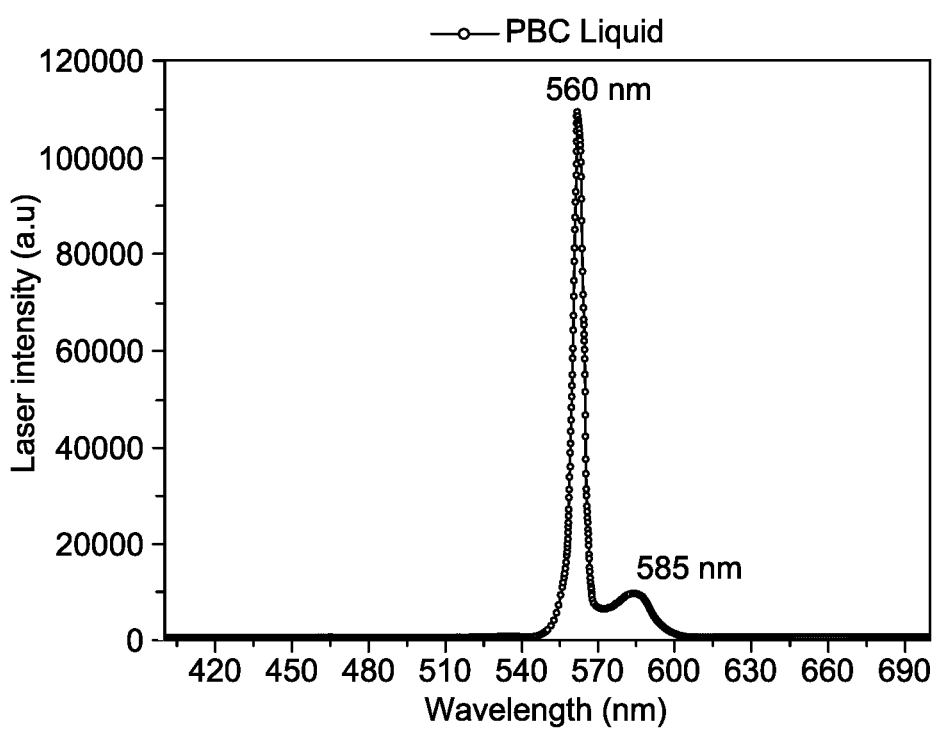
FIG. 5 shows a laser spectrum PBC (liquid), according to certain embodiments.
Figure 6:
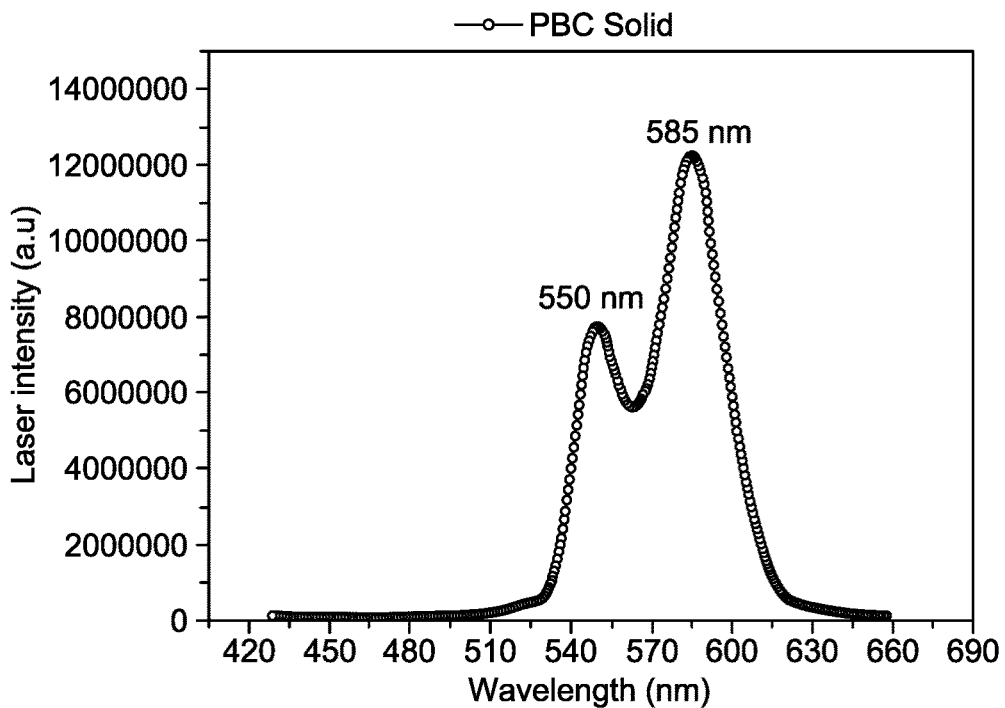
FIG. 6 shows a laser spectrum of PBC (solid), according to certain embodiments.
Figure 7:
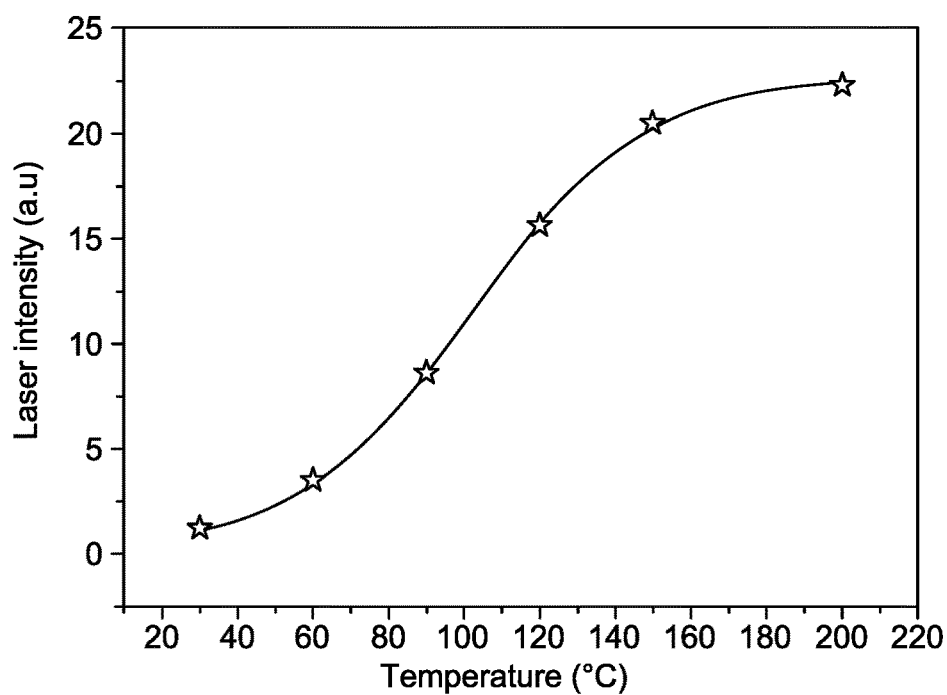
FIG. 7 shows laser intensity as a function of temperature of PBC liquid, according to certain embodiments.

When a laser source optically excites certain organic molecules, these organic molecules absorb the incoming photons and then emit either amplified spontaneous emission (ASE) or intensive light (laser). Most dissolved organic molecules in organic solution have one fluorescence and ASE band, yet some dye molecules and conjugated polymers have dual ASE bands under certain conditions. When an excited molecule combines with another molecule in the ground state, this process is called exciplex. Super exciplex occurs in cases where two similar excited molecules combine with a solvent which acts as a bridge between two excited molecules [Masilamani et al. Structural and Solvent Dependence of Super exciplex. *Spectrochim. Acta Part A Mol. Biomol. Spectrosc.* (60) 2004, 2099-2106, which is incorporated herein by reference in its entirety]. BDPP in THF, PBC liquid, and PBC solid were excited using the third harmonic (355 nm) of an Nd:YAG laser (pulse width of 9 ns; energy of 9 mJ). The laser beam was focused using a quartz cylindrical lens (focal length of 5 cm). The results showed that BDPP in THF produced a single laser peak at 517 nm (FIG. 4). PBC in liquid exhibited dual laser peaks at 560 and 585 nm as in FIG. 5. On the other hand, the PBC solid sample displayed dual laser peaks at 550 and 585 nm (FIG. 6). As seen in FIG. 5, the laser intensity at 560 nm is 8 to 12 times more intense than the laser spectrum signal at 585 nm for PBC liquid. In FIG. 6, the laser spectrum signal at 585 nm is 1 to 2 times more intense than the laser spectrum signal at 550 nm for PBC solid. Further, the intensity of the laser emitted by the material increases with increasing temperature, as is evident from FIG. 7. At a temperature of 110 to 130° C., the PBC has a laser intensity of 14 to 17 atomic units (a.u.), and at 190 to 210° C., the PBC has a laser intensity of 20 to 25 a.u.

Example 4: Crystal Structure and Melting Point Analysis of PBC

Figure 8:
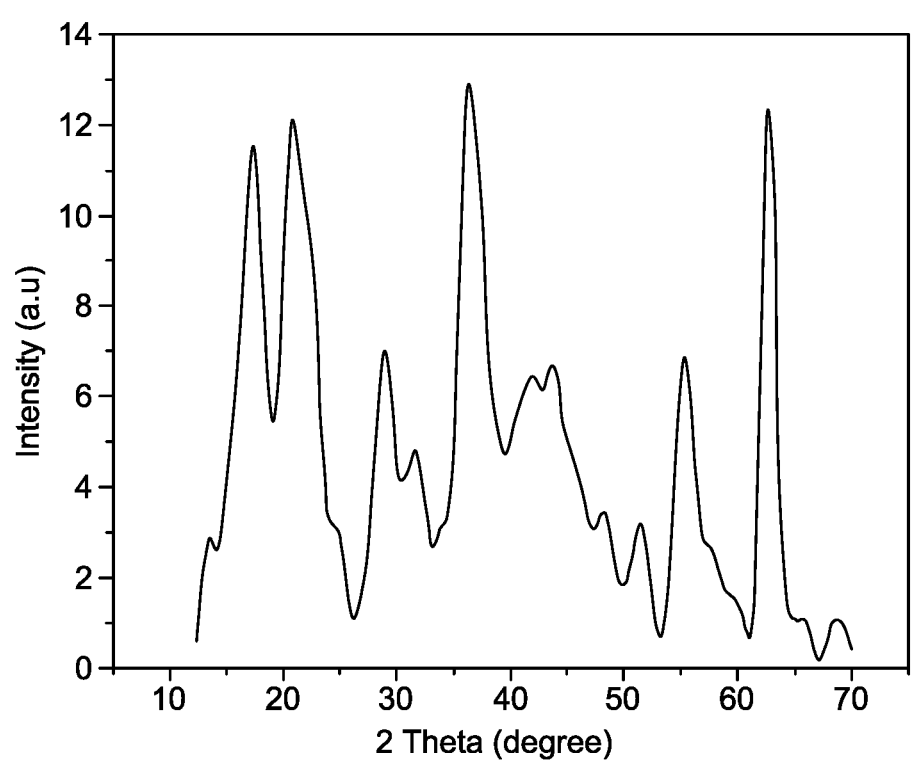
FIG. 8 shows X-ray diffraction (XRD) spectra of PBC solid, according to certain embodiments.

X-ray diffraction (XRD) analysis is a unique and powerful technique for analyzing the presence of crystalline and amorphous phases of the PBC material, which was carried out as per the literature. X-ray diffraction was employed to assess the crystallinity patterns of solid PBC. The XRD patterns of the PBC solid reveal distinct sharp peaks, indicating its crystalline phase, as shown in FIG. 8. Further, the melting point of the PBC solid was determined using a melting point apparatus and was observed to be around 350° C.

A polystyrene-based chalcone, a process of synthesizing the polystyrene-based chalcone, and uses thereof as an efficient thermal laser medium and smart coating are disclosed. The photonics material obtained displayed strong laser (FIG. 5, FIG. 6) and fine coating characteristics. The findings demonstrate that the PBC produced a laser adjusted in the visible spectrum, regardless of whether it is in a liquid or solid state, and even at elevated temperatures. The chalcone derivatives with the extended double bond conjugation with the carbonyl groups, coupled with the electron-donating properties of the dimethylamino substitution, have shown excellent photo properties (FIG. 3, FIG. 5, and FIG. 6). The material maintains its stability under photochemical conditions. Specifically, this substance may be utilized in a smart coating procedure due to its exceptional ability to withstand dissolution or corrosion when exposed to water or other organic solvents, and thereby providing an avenue for recycling polystyrene.

Numerous modifications and variations of the present disclosure are possible in light of the above teachings. It is, therefore, to be understood that within the scope of the appended claims, the disclosure may be practiced other than as specifically described herein.

The invention claimed is:

1. An acrylate chalcone polystyrene composite, comprising:
   units of a 1-(2H-1,3-benzodioxol-5-yl)-3-[4-(dimethylamino)phenyl]-(2E)-propane-1-one; and
   units of a 2-hydroxyethyl methacrylate,
   wherein the units of the 1-(2H-1,3-benzodioxol-5-yl)-3-[4-(dimethylamino)phenyl]-(2E)-propane-1-one and the units of the 2-hydroxyethyl methacrylate are in a matrix of a polystyrene, and
   wherein a molar ratio of the units of the 1-(2H-1,3-benzodioxol-5-yl)-3-[4-(dimethylamino)phenyl]-(2E)-propane-1-one and the units of the 2-hydroxyethyl methacrylate is from 1:510 to 1:590.

2. The acrylate chalcone polystyrene composite of claim 1, wherein the acrylate chalcone polystyrene composite is made by a process comprising:
   mixing 1-(2H-1,3-benzodioxol-5-yl)-3-[4-(dimethylamino)phenyl]-(2E)-propane-1-one and 2-hydroxyethyl methacrylate to form a first solution;
   dissolving polystyrene in a polar organic solvent while heating to form a second solution;
   mixing the first solution and the second solution at a temperature of 80 to 100° C. to form a reaction mixture; and
   cooling the reaction mixture to room temperature for 30 to 90 minutes to form a cooled reaction mixture.

3. The acrylate chalcone polystyrene composite of claim 2, wherein a weight ratio of the 1-(2H-1,3-benzodioxol-5-yl)-3-[4-(dimethylamino)phenyl]-(2E)-propane-1-one to the polystyrene is from 1:10 to 1:25.

4. The acrylate chalcone polystyrene composite of claim 2, wherein the polar organic solvent is tetrahydrofuran.

5. The acrylate chalcone polystyrene composite of claim 2, wherein the cooled reaction mixture is a liquid.

6. The acrylate chalcone polystyrene composite of claim 5, wherein the liquid has a laser spectrum signal at 555 to 565 nm and 580 to 590 nm.

7. The acrylate chalcone polystyrene composite of claim 6, wherein the laser spectrum signal at 555 to 565 nm is 8 to 12 times more intense than the laser spectrum signal at 580 to 590 nm.

8. The acrylate chalcone polystyrene composite of claim 2, wherein the process further comprises:
   heating and agitating the cooled reaction mixture to a temperature of 130 to 170° C. for 10 to 30 minutes to form a product; and
   cooling the product to room temperature for 8 to 12 days.

9. The acrylate chalcone polystyrene composite of claim 8, wherein the product is a solid.

10. The acrylate chalcone polystyrene composite of claim 9, wherein the solid has a solid laser medium at 545 to 555 nm and 580 to 590 nm.

11. The acrylate chalcone polystyrene composite of claim 10, wherein the laser spectrum signal at 580 to 590 nm is 1 to 2 times more intense than the laser spectrum signal at 545 to 555 nm.

12. The acrylate chalcone polystyrene composite of claim 1, wherein the polystyrene-based chalcone has a melting point of 330 to 370° C.

13. The acrylate chalcone polystyrene composite of claim 1, wherein the acrylate chalcone polystyrene composite has a fluorescence signal at 530 to 540 nm.

14. The acrylate chalcone polystyrene composite of claim 1, wherein at a temperature of 25 to 35° C., the acrylate chalcone polystyrene composite has a laser intensity of 0.5 to 3 atomic units (a.u.).

15. The acrylate chalcone polystyrene composite of claim 1, wherein at a temperature of 80 to 100° C., the acrylate chalcone polystyrene composite has a laser intensity of 8 to 10 a.u.

16. The acrylate chalcone polystyrene composite of claim 1, wherein at a temperature of 110 to 130° C., the acrylate chalcone polystyrene composite has a laser intensity of 14 to 17 a.u.

17. The acrylate chalcone polystyrene composite of claim 1, wherein at a temperature of 190 to 210° C., the acrylate chalcone polystyrene composite has a laser intensity of 20 to 25 a.u.

18. The acrylate chalcone polystyrene composite of claim 1, wherein the polystyrene is bonded to the units of the 1-(2H-1,3-benzodioxol-5-yl)-3-[4-(dimethylamino)phenyl]-(2E)-propane-1-one and the units of the 2-hydroxyethyl methacrylate.

19. The acrylate chalcone polystyrene composite of claim 1, wherein the units of the 2-hydroxyethyl methacrylate are linkers in between the units of the 1-(2H-1,3-benzodioxol-5-yl)-3-[4-(dimethylamino)phenyl]-(2E)-propane-1-one.

* * * * *